(12) United States Patent
Krack et al.

(10) Patent No.: US 6,941,369 B1
(45) Date of Patent: Sep. 6, 2005

(54) GATEWAY CGI AND ACCESS CONTROL MANAGER FOR SECURE INTER-SERVER COMMUNICATIONS WITH SYSTEM AND METHOD FOR WEB SERVING USING SAME

(75) Inventors: John L. Krack, Fridley, MN (US); Joseph D. Condon, Woodbury, MN (US)

(73) Assignee: Unisys Corporation, Blue Bell, PA (US)

( * ) Notice: Subject to any disclaimer, the term of this patent is extended or adjusted under 35 U.S.C. 154(b) by 851 days.

(21) Appl. No.: 09/620,047

(22) Filed: Jul. 20, 2000

(51) Int. Cl.[7] ........................................... G06F 15/173
(52) U.S. Cl. ..................... 709/225; 709/227; 719/311; 370/431
(58) Field of Search ............................. 709/225, 227, 709/218, 228; 719/311; 370/431; 713/201

(56) References Cited

U.S. PATENT DOCUMENTS

| | | | | |
|---|---|---|---|---|
| 5,754,830 A | * | 5/1998 | Butts et al. ................. | 709/227 |
| 5,828,833 A | * | 10/1998 | Belville et al. ............. | 713/201 |
| 5,903,732 A | * | 5/1999 | Reed et al. ................. | 709/229 |
| 6,038,590 A | | 3/2000 | Gish .......................... | 709/203 |
| 6,067,623 A | * | 5/2000 | Blakley et al. ............. | 713/201 |
| 6,072,870 A | | 6/2000 | Nguyen et al. ............. | 380/24 |
| 6,085,224 A | | 7/2000 | Wagner ...................... | 709/203 |
| 6,324,648 B1 | * | 11/2001 | Grantges, Jr. .............. | 709/229 |
| 6,510,464 B1 | * | 1/2003 | Grantges et al. ........... | 709/225 |
| 6,751,677 B1 | * | 6/2004 | Ilnicki et al. .............. | 709/229 |

OTHER PUBLICATIONS

Common Gateway Interface (CGI) (http://hoohoo.ncsa.uiuc.edu/cgi/intro.html).

CGI tests cases (http://hoohoo.ncsa.uiuc.edu/cgi/examples.html) (link from previous page).

http://hoohoo.ncsa.uius.edu/cgi–bin/test2.cgi/extra/path?a+query (link from previous page).

The Common Gateway Interface (http://hoohoo.ncsa.uiuc.edu/cgi/primer.html).

CGI Environment Variables (http://hoohoo.ncsa.uiuc.edu/cgi/env.html).

The CGI Specification (http://hoohoo.ncsa/uiuc.edu/cgi/interface.html).

* cited by examiner

Primary Examiner—Glenton B. Burgess
Assistant Examiner—Anita Choudhary
(74) Attorney, Agent, or Firm—Michael B. Atlass; Mark T. Starr

(57) ABSTRACT

Secure access to internal data resources is facilitated through a gateway CGI on an internet visible computer system with an internet visible web server configured by rules to forward calls to the gateway CGI. The gateway CGI packages information from the call to send by secure socket connection to a server-like access control program on a secure host system which can reconstitute the call if authenticated and/or validated and serve the request, returning the sought after data or resource through an encrypted channel if desired. Variations for high throughput environments and operation with application program session controllers are described.

22 Claims, 6 Drawing Sheets

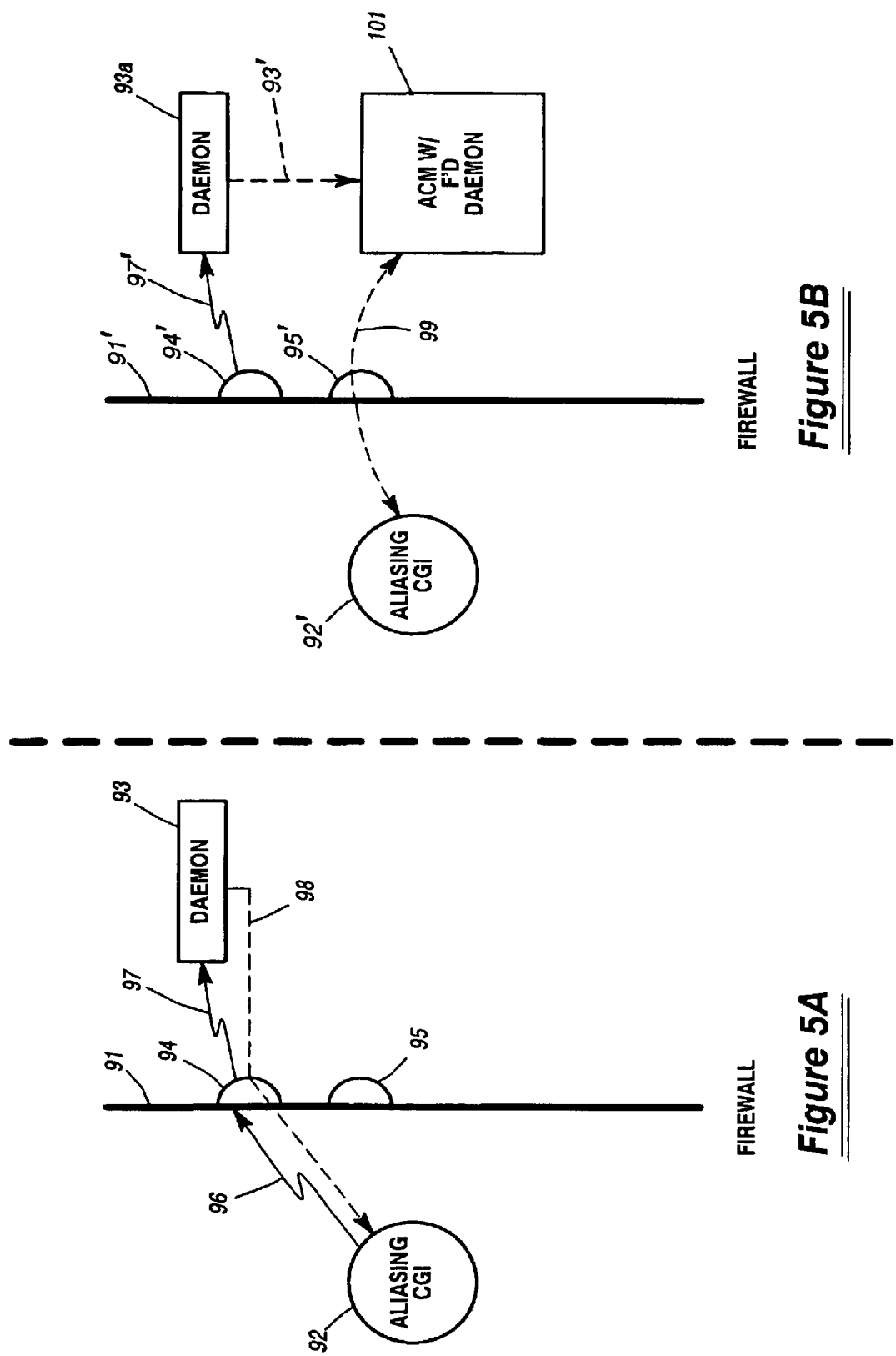

GATEWAY CGI AND ACCESS CONTROL MANAGER FOR SECURE INTER-SERVER COMMUNICATIONS WITH SYSTEM AND METHOD FOR WEB SERVING USING SAME

BACKGROUND OF THE INVENTION

This invention relates to web serving generally and has particular applicability to methods and systems for providing secure web serving of data of any sort that may be accessed by an internal server secured behind a firewall, so that from the point of view of the web browser the data appears to be directly accessible to the web.

There are many situations in computer networks where a gateway needs to be maintained to keep data within an "Inside" area from being accessible or manipulable by users in an "Outside" area. A typical example would be the reservation data in an airline reservation system would be Inside, and preferably only accessible to people or users the airline would want to be able to use that data. Otherwise unauthorized users could book flights in the names of phantom passengers and cause other mischief for the airline. Another example could be a bank's account data, to which an account Holding user might want access. Providing access to such data over the World Wide Web, or the Internet, means a risk of security breaches and unauthorized users accessing the data or manipulating it without desired authorization. For example, in a system where a user could pay bills through access to his account over the Internet, an unauthorized user having access could as easily pay himself the contents of the account Holder's account.

Accordingly, many "firewalls" have been developed. These include the FIREWALL-1™, and an application level firewall gateway called InterLock™, available from Advanced Network Services (Reston, Va.). Trusted Information Systems, Inc. (Glenwood, Md.) produces a firewall gateway called Gauntlets™. Other such products are available through Raptor Systems (Wilmington, Del.), Milkyway Corporation and Seachange Corporation (of Ontario, Canada). There are various other solutions to maintaining internal data safe from errant web browsers, and numerous companies that produce computer and software products produce proprietary systems. In the U.S. Pat. No. 5,903,732, (incorporated herein in its entirety by this reference) issued to Reed et al, a single computer having a partitionable operating system provides gateway access to a web browser. On the "external" (i.e., Internet visible) side, which contains the web server, an index or table of CGIs corresponds to actual CGIs that should be available on the other side of a partition (or firewall). If the web browser has asked for a CGI in the table, the Reed system can call the CGI in the internal partition to retrieve application database information for a web browser on the Internet. Reed does not teach how to obtain HTML pages, data, or images using this method, instead he makes such data available in a "SYSLO" area to which the Web server has direct access.

It is important that the CGI definition be clarified here before we continue since its functions and limitations provide much of the basis for the problems and the solutions described herein. A CGI or Common Gateway Interface, is an executable program (or script) that can obtain or generate a single object and return it to the calling entity. It supplies the middleware among World Wide Web servers external databases, and other information sources. The CGI interface defines a method for the Web server to accommodate additional programs and services that may be used to access external applications from within the context of any active Web document. Working in tandem with HTTP server applications (httpd's) CGI applications can service requests made by web clients by accepting requests for services at the server's behest, handling those requests and sending appropriate responses back to the client. A client HTTP request consists of a Uniform Resource Locator (URL), a request method, and other important information (like "environmental" variables) about the request provided by the server. The CGI specification at the present time is located at http://Hoohoo.ncsa.uiuc.edu/cgi/interface.html.

In the Reed, et al. reference (hereinafter just "Reed"), the web server in the external partition cannot communicate directly with the CGI applications, but has a plurality of outside CGI links to the CGI applications that are located in the inside compartment. Reed attempts to form a link between the Web server and the gateway server program and if accepted the gateway server creates a new process invoking the corresponding CGI, and connecting the HTTP data stream to the CGI application. Such a system may work well when one has a partitionable operating system as is used in Reed, but it does not work well in systems with non-partitionable Operating Systems (OS's) or for systems using separate computers altogether for the inside and outside compartments. (Though the Reed patent states that Windows NT is partitionable, at the time of Reed's filing it was not, to the knowledge and belief of the inventors herein, although the UNIX version they were using was appropriately partitionable). Further, because of the set-up procedures required for the Reed system, the dynamic flexibility that could be available is not. Also in Reed, the images, data and other files in the SYSLO are retrieved by a different mechanism than the one described for invoking CGI's on the "Inside" partition.

Accordingly there is a need to provide a system of handling requests from Web servers securely that works well with separate computer systems for inside and outside compartments. There is also a need to provide a system for handling various types of web object requests, including CGI requests, requests for HTML static files, downloadable data files, image files, and the like, securely in such systems. Also, alternatives to Reed are required or may be desirable that are more flexible and do not require the set-up procedures needed in a system like Reed's when applications are changed, whatever the system. Details of the problems inherent in other systems will be described in further depth as the description of the inventive features are set forth in the Detailed Description section below.

Although sufficient detail is provided herein to enable one of ordinary skill in these arts to be able to make and use the inventive concepts taught herein, additional background and fuller understanding of the art may be had with reference to some patent art including, for understanding concepts such as gateways and multilevel authentication, the U.S. Pat. No. 6,072,870 issued to Nguyen et al, and U.S. Pat. No. 6,067,023 to Blakley III et al. A process for detecting cookie data and other data (called trigger events in the reference) is described in U.S. Pat. No. 6,085,224 issued to Wagner. These three patents are incorporated herein in their respective entireties by this reference.

In general, where there are particular restrictions on system configuration such as a corporate security rule requiring that no database data, or no confidential data at all be maintained on Internet-visible (i.e., "outside") systems, or disallowing passage of HTML transactions from the Internet to a server inside the corporate firewall, even if those transactions are proxied so as to shield the server system from direct Internet access; such restrictions and other similar ones must be accommodated. Thus, a Web application built using CGIs, and referencing data deemed to be confidential, must have its code co-located with its server outside the firewall, and its sensitive data inside. Applications designed for co-located code and data must undergo significant re-engineering to operate in this manner unless initially set up this way. Moreover, to provide failure resiliency in this environment requires both the application and the data to reside on resilient platforms, greatly increasing the platform cost compared to co-locating the application with the data because one would have to provide two resilient platforms. (Resiliency is a form of architecture that has no single point of failure. In most definitions, it means there is fail-over capability. Redundant systems also provide resiliency but require or assume concurrent operations instead of employing a hot standby. Redundancy can be considered a form of resiliency.)

Attempting to overcome some or all of these difficulties, challenges, and limitations has led to the invention and its features described herein below.

BRIEF DESCRIPTION OF THE DRAWINGS

FIGS. 5A and 5B are heuristic block diagrams of the establishment of a socket between an Gateway CGI and an Access Control Manager in accord with a preferred form of the invention.

SUMMARY OF THE INVENTION

Detailed Description of the Preferred Embodiments

Figure 1A:
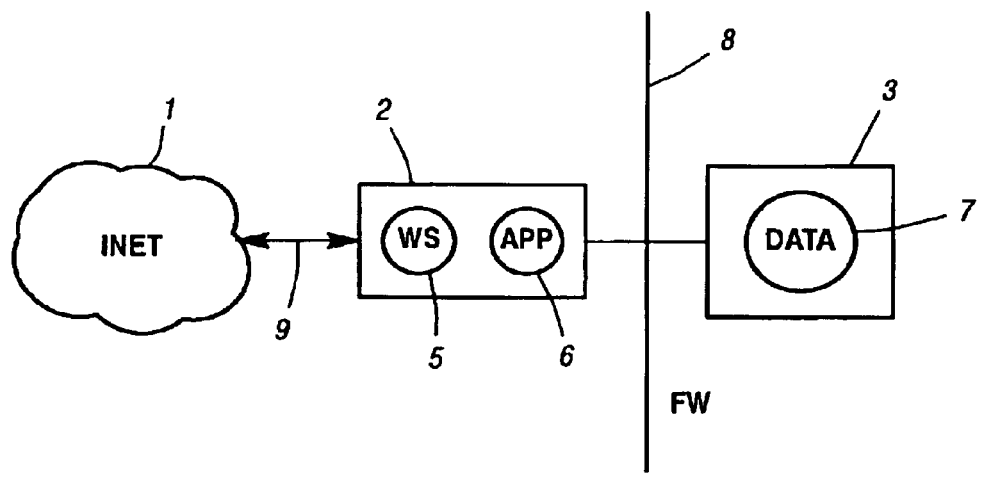
FIG. 1A and 1B are heuristic block diagrams representing two forms of server architecture for securing data behind a fire wall.
Figure 1B:
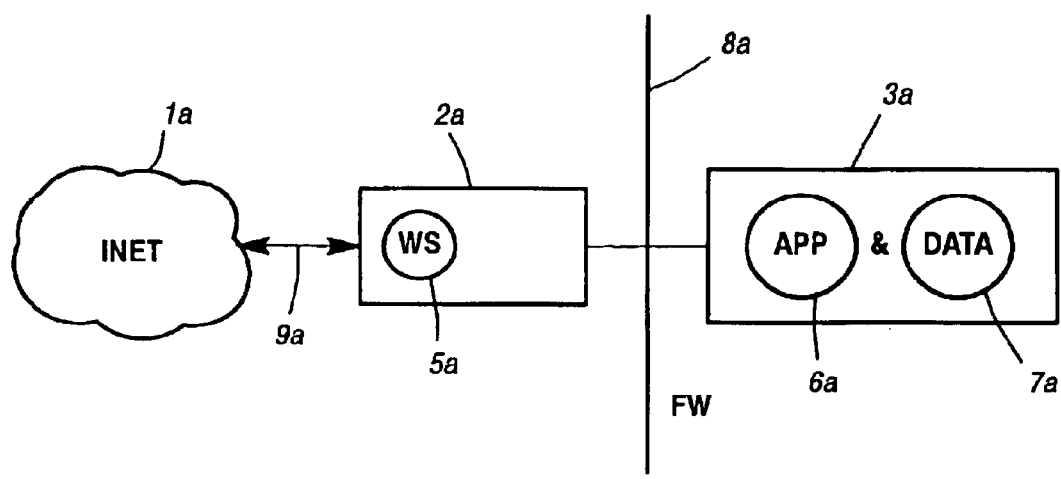

Refer first to FIGS. 1A and 1B wherein the basic architectures for securing data behind a fire wall are illustrated in simplified form. In FIG. 1A, the web browser on the Internet 1 communicates through a channel with the web server 5 containing computer system 2, and thus the web server 5 itself. The web server 5 has to be able to get to the application 6 which must be able to use the information from the internet to authenticate the user to allow the request to cross the firewall 8, separating the computer system 2 from computer system 3. (In the architecture illustrated in Reed, there is only one computer system but the firewall (similarly to the firewall 8 illustrated here) governs crossing the partition in Reed's system). Thus, Web server 5 has direct access to the application 6. If application 6 is in a secured area as defined in the web server's rules, the web server might solicit a logon, and then launch application 6, otherwise it would launch application 6 without verification. Application 6, in turn, accesses sensitive data 7 on system 3, but must cross firewall 8 to do so. The data 7 is afforded an additional level of security by being placed behind the firewall 8, in that if someone should, by exploiting a weakness in the server 5 or through some other means, gain access to the operating system on system 2, significant additional effort would be required to breach the firewall 8 to gain access to data 7. This architecture however, requires that application 6 be designed to access data in a remote location. For extant applications this may require major redesign to accommodate. Also, if the application allows easy access to data through the firewall, this in itself removes the security level of the firewall. Although methods such as Network File Sharing, are available to make the data location transparent to the application, they typically compromise the security added by the firewall due to their open nature.

FIG. 1B describes a network architecture that would be more secure without the problems inherent in separating the application from the data as in the architecture of FIG. 1A. Unfortunately, without our invention, there is no secure way to access the data or the application from the web.

FIG. 1B is an architecture more suited to the present invention, having a simpler computer system 2a running the web server 5a, and keeping the highly available and costly computer system 3a behind a firewall 8a. In such a system, the application program 6a that deals with the data 7a are in a single computer system, meaning that to effect resiliency at moderate cost, existing applications designed to run with co-located data need not be re-engineered to use remote, data in order to enjoy the security of a firewall 8a.

If an application is designed to operate with no local dynamic data, it may be logical, from a cost-effectiveness point of view of the computer architecture to, set up a "server farm" or pool of identical generic servers outside the firewall, with a copy of the application on each server, while keeping the data on a resilient platform inside the firewall. ("Dynamic data" is data that is modified by the application and later used by that or other applications while processing the same or subsequent requests.) A dispatcher (in our preferred embodiment we use a Cisco router but clearly other load sharing products can be substituted) can then direct incoming Web traffic to an available server, which then can launch the requested application to reference the common database and process the request. Since the next transaction for that User may be handled by another server in this architecture, it is imperative that no server have the only valid copy of data which might be needed by other servers processing future transactions. All such data must reside, and be updated in, the common database. The advantage of the server farm approach is that the servers can be low-cost PC type systems, and sophisticated fail-over capability is not required since a failing server is simply removed from the pool and the others take up the slack. A significant disadvantage is that when an application changes, an updated or new copy must be installed on each server.

Figure 2:
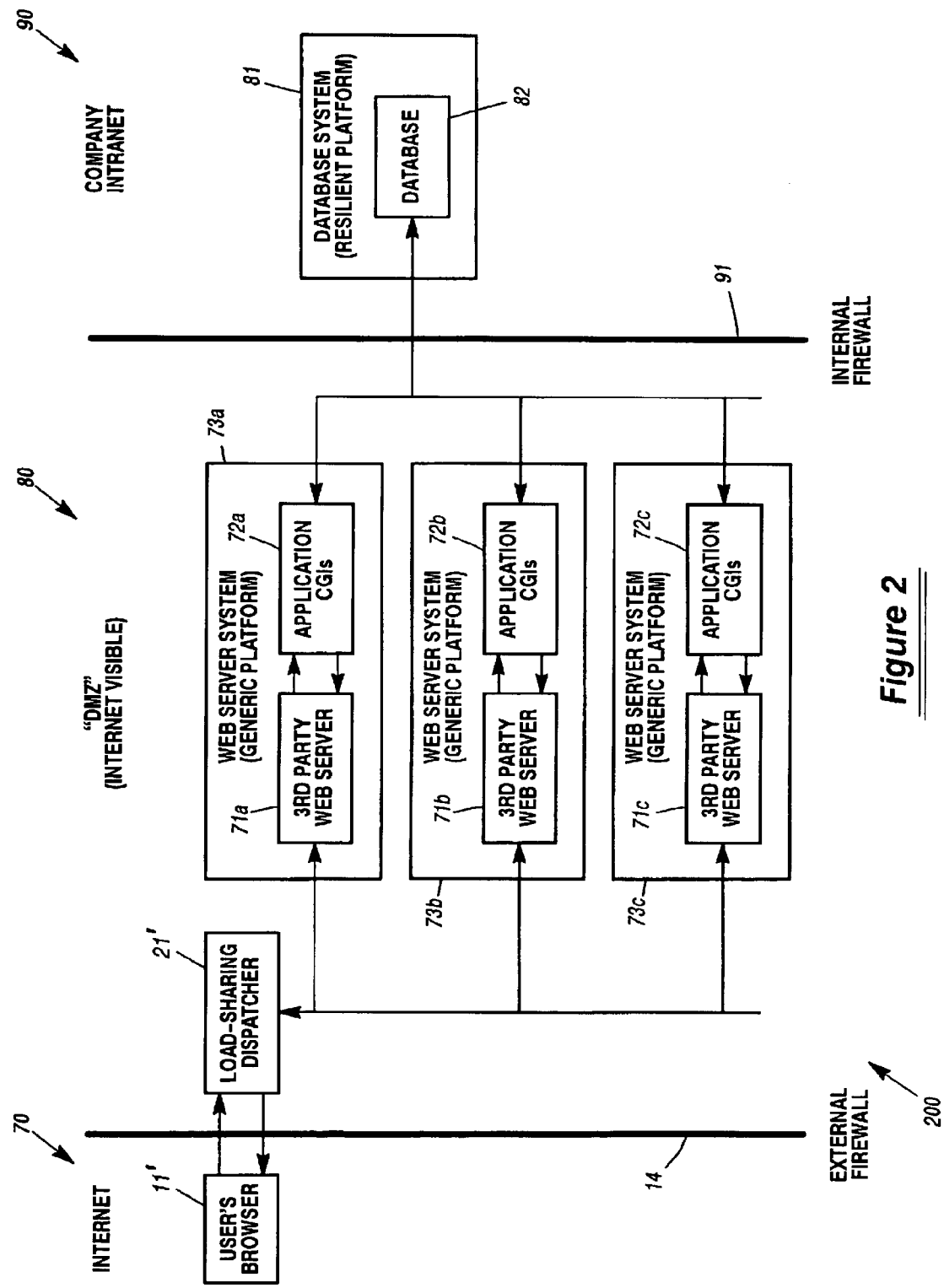
FIG. 2 is a block diagram illustrating a variation in architecture from the diagram of FIG. 1A with further detail regarding the architecture of the Web server.

The cost advantage can be seen more readily in context in FIG. 2 which is an extension of FIG. 1A and describes the use of the architecture of the preceding paragraph. In FIG. 2, a diagram 200 illustrates how a set of copies of web server platforms 73a–c can share the load of web browser (11') requests. Here, using a dispatcher 21', requests can be sent to the server pool. Here each server in the pool may receive requests when other servers are busy fielding them. The server platform should have a Web server 71a–c and a set of application CGIs 72a–c, respectively, which handle the communication of the requests to get data from the database 82 on the resilient platform 81 behind the internal firewall 91. In such a system as in diagram 200, the changing of data structures in the database must be coordinated with all the Applications (Application CGIs 72a–c) that communicate with the database 82. It would not be required to coordinate multiple copies of an Application if there is only one copy of the Application accessing the data for the web server. Such a system can be had using the model described in FIG.

1B having the data 7a and the application 6a on the same platform with no partition or firewall between them.

Figure 3A:
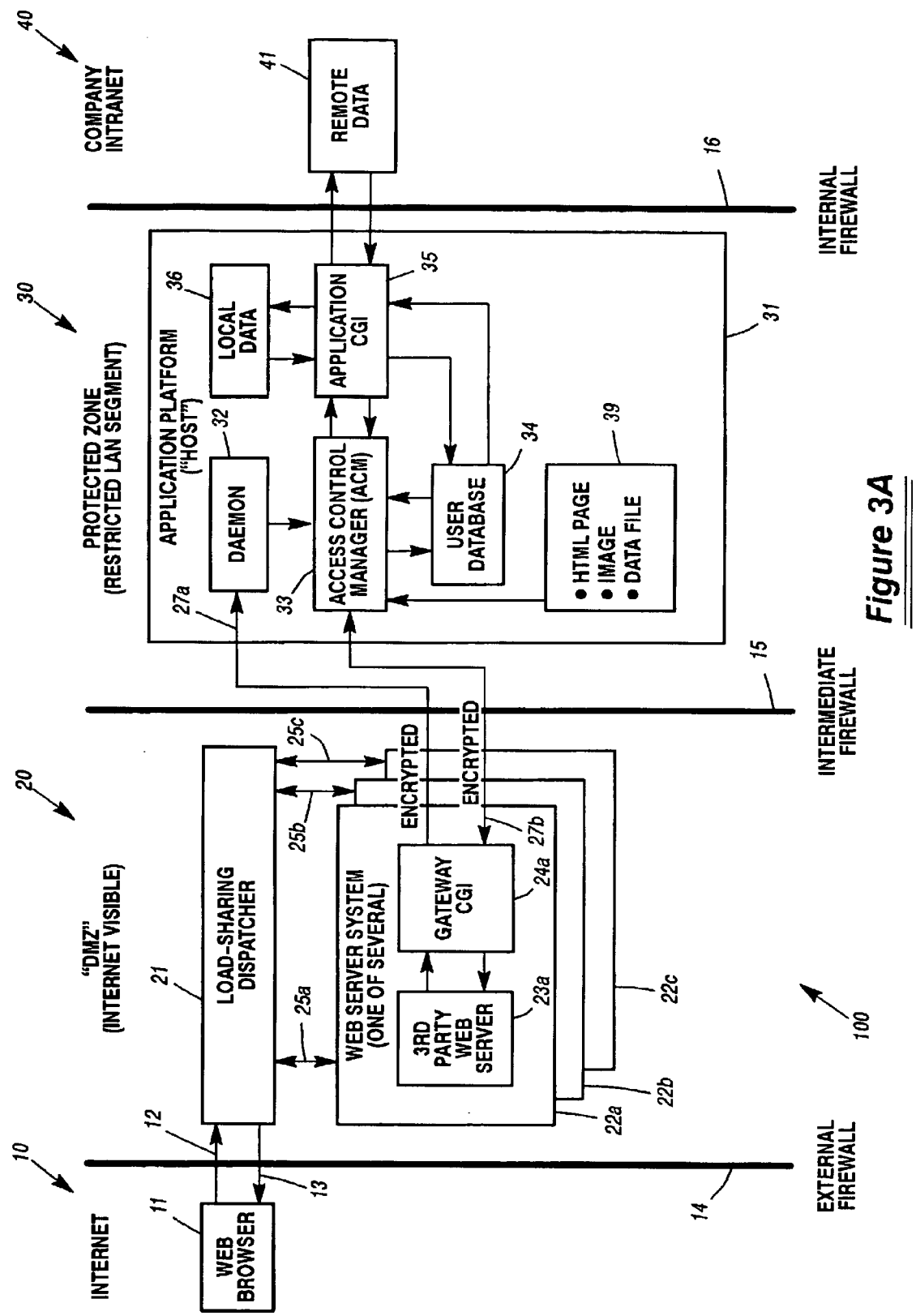
FIGS. 3A and 3B are block diagrams of preferred forms of the invention in a Web server environment.
Figure 3B:
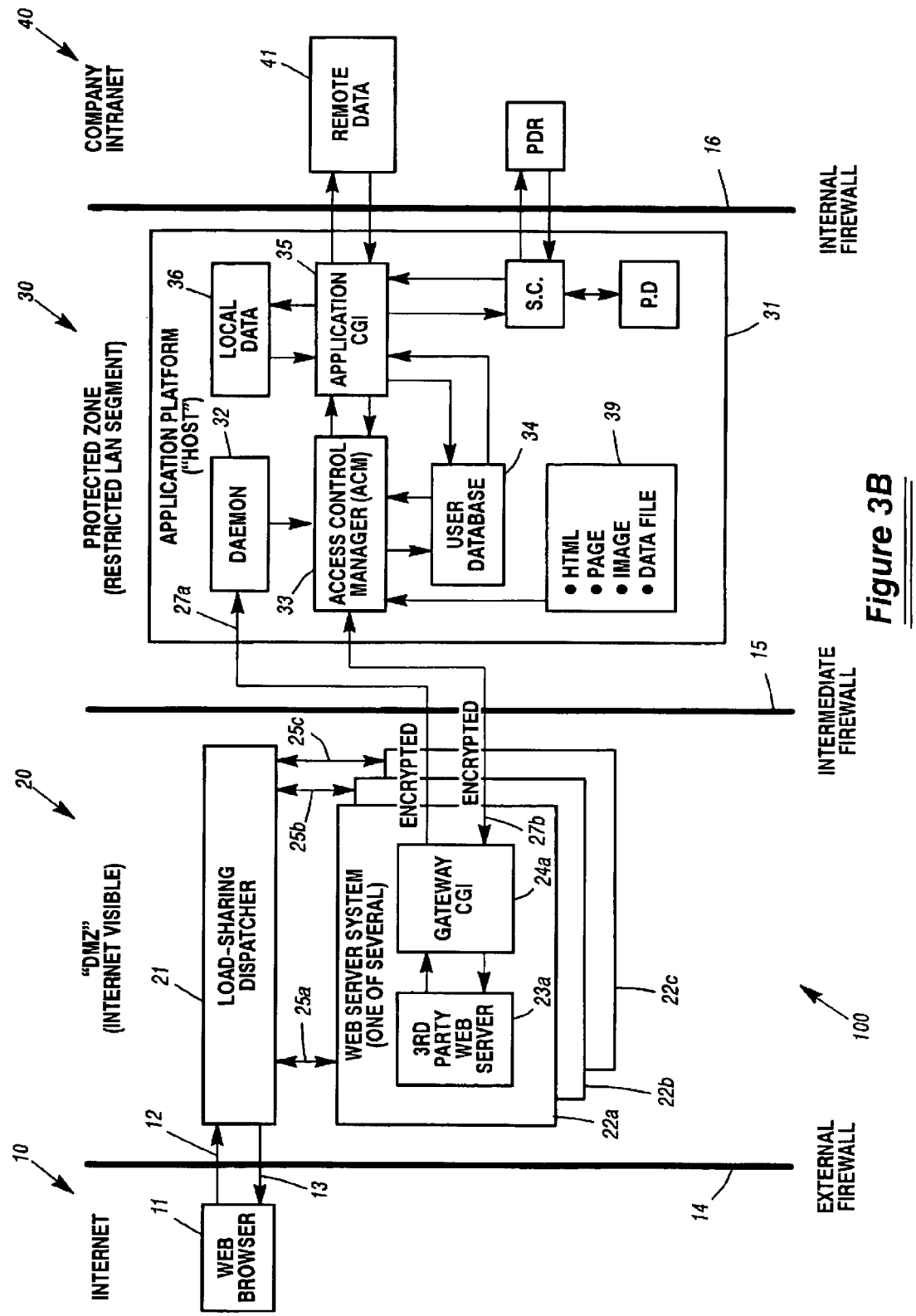

In its most preferred form our invention works on a system having the load sharing architecture of multiple front end inexpensive server platforms in an internet visible zone, with the application and its data located behind a firewall separating it from the internet visible zone. This could be called a restricted LAN segment or protected zone. This is quite different from the architecture, described in FIG. 2 in the way that the architecture of FIG. 1B is different from that of FIG. 1A. Thus, referring to FIGS. 3A and 3B, an Internet architecture consisting of a pool of generic Internet-visible Web server systems 22a–c (providing low-cost resiliency and scalability), are enabled to communicate with participating corporate or other Host applications 35 running in a protected zone 30 of a corporate computer system Intranet on a highly resilient system (or systems, duplicates not shown) 31, accessing local data 36, supported by a common User database 34 and registration/authentication process. The Host application 35 may also have access to other protected zones 40 on the intranet where data 41 (or other applications, not shown) may also be available to the Host application 35.

In the most preferred embodiment, a Reliant HA system 31 (a product of Veritas Software), running UnixWare (a product of The Santa Cruz Operation, Inc., of California) is installed on a restricted LAN segment inside an "Intermediate" firewall 15 (but outside the Internal firewall 16), and a "server farm" 22a–c of generic (Apache is one highly used third party server (available from the Apache Foundation) but others can be used) Web servers 22a, 22b, and 22c, will be set up outside the intermediate firewall 15 in the so-called "DMZ" 20, behind the external firewall 14. This two-zone (without the Intranet) or three-zone (including the Intranet behind firewall 16) strategy described below will be used to communicate through the intermediate firewall 15. It should be noted that the use of particular types of hardware and software is not required. The Reliant HA software provides convenient fail-over capability to continue running the Host processes if an individual Host hardware system fails in an almost seamless manner, but there are other programs that do this which could be used, or proprietary systems could be built to accomplish this result. In fact, if resiliency is not a problem in the particular use to which this invention will be put, a single Host may be appropriate, with cheaper and even easier to use software operating it. Any hardware or software could be used so long as it provides the ability to support the inventive features described herein.

Various components can even be left out in simpler configurations, and the inventive features can find easy applicability to even single web-site servers that have protected "internal" environments as will be apparent to one of ordinary skill in designing web server architectures in light of the disclosure of this patent.

To address the disadvantages described above when accessing an application platform separated from a web server by a firewall, an architecture is described that allows an application to coexist with its database on a single computer or at least within a single zone thus saving re-engineering costs, with communication through the firewall between the server in the external or Internet visible zone and the application handled by a proprietary access control manager we call the ACM 33 (for Access Control Manager) in the internal zone 30. This design reduces maintenance by keeping only one copy of the application and its data on a resilient platform in a safe zone, and preserves redundancy on the Server side, allowing the server systems to be truly generic, not requiring update each time an application changes.

In basic terms, the ACM server 33 receives a message that has information (like the URL, for example) indicating the CGI (or other object) needed and other information (like environmental variables, for example) necessary to reconstruct the original web browser 11's request. This is done via a secure socket established by a Daemon 32 that spawns an instance of the ACM when it receives a request message on line 27a, tying that instance to the Gateway CGI 24a through the socket connection 27b. A user database 34 can authenticate the user making the request via a unique "cookie" previously set by the ACM 33 and sent by the browser 11, which the ACM should receive back if the same browser is making the request as got the cookie. (Various other methods of authentication may be used if desirable, but cookies are the most common and easy to use and thus preferred). If authenticated, the ACM 33 can then call the application CGI 35, which can get the information through a proprietary database session controller SC (FIG. 3B implementation) or otherwise retrieve data from other local database stores 36, or via normal access through a firewall 16 to remote intranet database data pools 41. The CGI 35 can also validate a user by accessing user data 34 and can tailor its behavior in accord with user entitlements specified in the user database 34. (The ACM 33 can also retrieve other forms of data from storage area 39, containing either HTML pages, images, or data files as indicated by the information requirement of the original request.) If a session controller like SC were used, itself a form of CGI, for proprietary databases like those of Oracle Corporation for example, they may authenticate the user itself, possibly requiring separate logons before retrieving data in response to the CGI request. If such a session controller were used, various strategies for accommodating logons can be implemented within the skill of the designer. Databases PD which are on the same platform as the session controller SC or like the database PDR which is remote can be accessed through different strategies as well, if desired.

An important element of the invention is that all requests presented to the Web server 23a are transformed by a server rule to launch the Gateway CGI 24a. The Gateway CGI extracts the information necessary to reconstruct the original URL, and other environmental variables passed by the Web server 23a; packages these data elements in an Encoded Request Packet (ERP); and forwards the ERP to the Access Control Manager as described below.

To establish the connection between the Gateway CGI 24a and the ACM 33, a Daemon 32 is constantly listening for traffic on a port 27a, (which we refer to as an establishment socket to distinguish it from the communications socket which will handle communications between the Gateway CGI and the Access Control Manager web server). Each server in the server farm 22a–c, has an Gateway CGI available to output signals to the port 27a when they are servicing a request from a Web browser.

Refer now to FIGS. 5A and 5B, in which the separation between the systems is illustrated merely as a firewall 91, 91' for heuristic purposes. The Gateway CGI is a program that in response to the Web browser's request and its being forwarded by the web server signals the Daemon 93 through a port 94 that the Gateway CGI uses to initiate all communications of this nature with an ACM. In response, the Daemon 93 sends back a message 97, indicating that the further communications regarding this request are to be accomplished through a second port 95, the communications socket designated by the Daemon, preferably in accord with a program intended to maximize ACM availability to the Gateway CGIs of the server farm. In the second part of this process, in FIG. 5B, the Daemon 93a has replicated its communications functions into a spawned ACM 101, so that the ACM 101 has the port address of port 95' which the Gateway CGI 92' will expect to communicate through in a channel 99. The Daemon 93a (or a copy), then goes back to listening on port 94' for new Gateway CGIs wishing to establish communications with an ACM.

It is possible to send the packetized message by the Gateway CGI along with the original communication to the Daemon, and have the forked Daemon communications parts carry the packetized message into the ACM, however we prefer a two step process whereby a signal to open a port is sent and after the port is opened and the ACM created, we pass the packetized message with the URL and environmental information types in it to the ACM for reconstruction and fulfillment.

To recap and cover the details differently please refer to FIG. 3 again. The original request sent by the Internet Web browser 11 on channel 12/13 was directed to a particular Internet visible computer 22a by a load sharing dispatcher 21 to make the overall system more resilient and faster, being able to handle many web browser requests nearly simultaneously via the server farm 22a–c. The request itself from the browser will contain a call to a specific CGI and some environmental data. As should be apparent now, this request would be forwarded by a web server 23a in the computer system 22a to the Gateway CGI. The Gateway CGI extracts, gathers and packages the relevant data and sends it in an encoded protocol, which can be encrypted also, if preferred, in what we call an ERP for Encoded Request Packet. The ERP is sent across an encryption channel to the Daemon 32 waiting to receive any signals for incoming ERPs or such ERPs themselves, depending on the embodiment chosen. (In the preferred embodiment, all sockets between the gateway CGI and the secure zone pass encrypted data streams.) When the Daemon 32 receives such a message, it spawns an instance of the ACM server software which reads the serialized packet and reconstitutes it into a URL call (which could be for a CGI, data, etc). The user information and relevant environmental data (for example cookies previously set by the ACM) can be used to authenticate the request and deny access if authentication proves the request to not be authorized. This data can be called identification data, to distinguish it from the URL data which the ERP must also contain.

In the meanwhile, other requests can come in through other Gateway CGI's or a different instance of the same Gateway CGI 24a, and the Daemon can spawn other instances of the ACM which can authenticate those users and messages and serve them as well. Preferably the Daemon will fork itself each time it receives a message, however, multiple instances of the Daemon can be running at once in pools to make the port they listen to more responsive, assuming the hardware on the Host can handle it.

Figure 4:
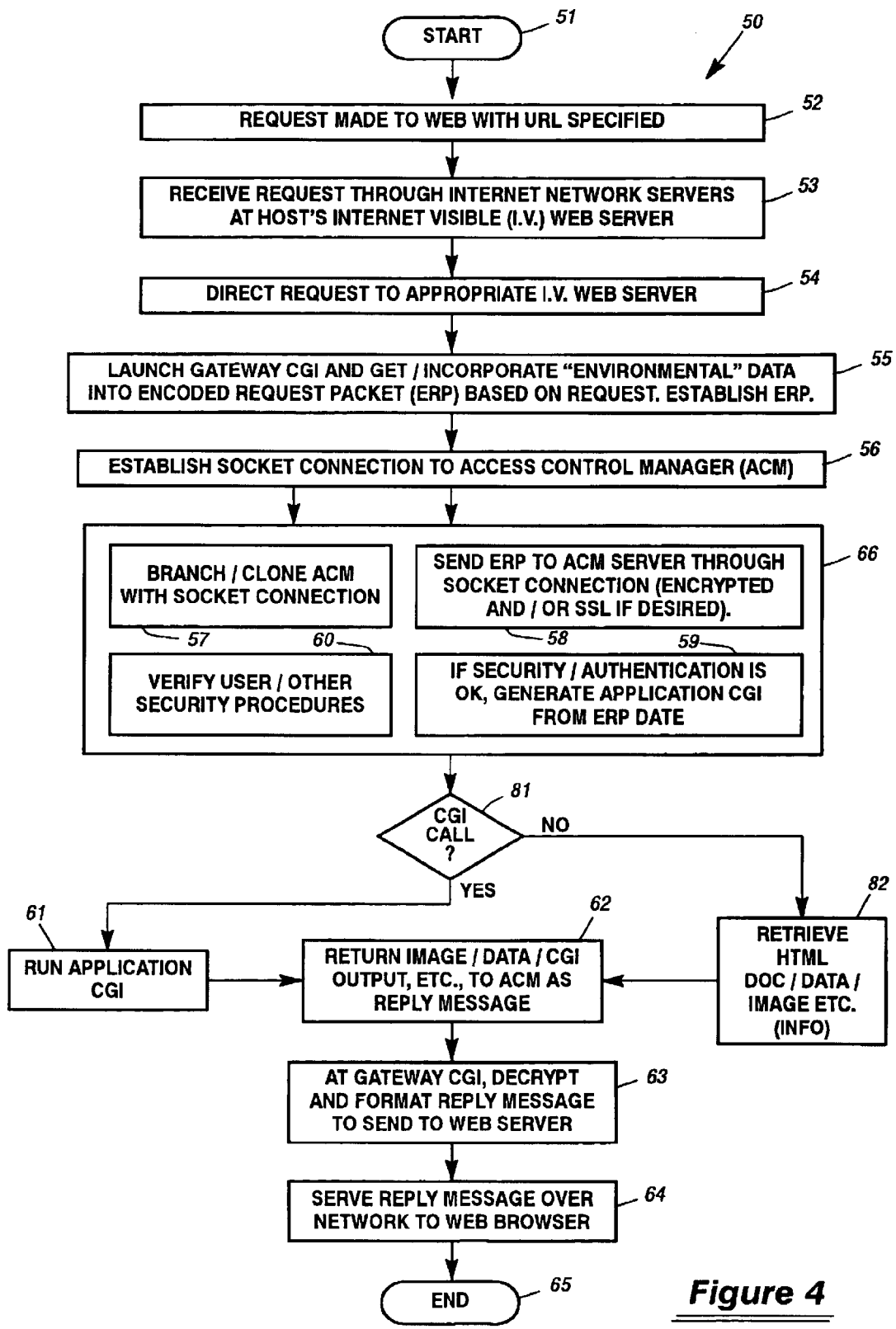
FIG. 4 is a flow chart illustrating a preferred embodiment method of carrying out the invention.

Accordingly then, refer now to FIG. 4, which illustrates via a flow chart 50, the process flow by which requests from web servers are handled in accord with a preferred embodiment of the invention.

At the start 51, a User's Browser makes a CGI, image, data file (to be downloaded), or static HTML call 52 (also called a request message herein) over the World Wide Web, specifying the company or other specific server's Internet address. The load sharing dispatcher, in the preferred embodiment, intercepts the call or request message 53 and routes it 54 to one of several identical rules-based 3rd party Web servers. These can be any kind including without limitation for example those by Netscape, Apache, or Microsoft IIS Web Server, so long as they can be configured with aliasing rules to determine how to handle requests or calls from web browsers, and particularly so a configuration rule would be available to route all requests to the Gateway CGI. They can be running on any kind of computer system, although in our preferred embodiment using a server farm, we currently use a Unisys Unixware server platform running on an Apache web server. (It should also be recognized that if a single computer system front end is used, it would handle the dispatcher function by handling the call itself, thus collapsing steps 53 and 54.) The Web server will have been configured with its rules to redirect the call to an "Gateway" CGI which begins the process of calling the Daemon to establish communications with an ACM on the secure hardware.

In step 55, the Gateway CGI will extract all the useful information needed from the call, such as the URL, and any environmental data (including but not necessarily limited to cookies) and user data passed by the browser or server that may be required to certify the user call or request message as being authenticated and acceptable to access the requested data or programs downstream. If further information is needed, for example, a user log-on, the request for an authenticating log-on is sent back to the browser. This function can be handled downstream by the ACM, passing through the Gateway CGI the ACM's request for network information to the web server when it examines what it receives from the Gateway CGI if that is lacking. In any event, in this step 55 the Gateway CGI extracts from the call all useful information and forms what we call an "Encoded Request Packet" or ERP which contains all this useful information within a packetized or otherwise packaged, serialized stream.

To communicate with the ACM, the Gateway CGI must establish a sockets connection in step 56. In the preferred embodiment communications over this socket is encrypted to provide a significant extra layer of security. When the generic CGI is sent to a port in the Host system, it opens a sockets connection to a Daemon a monitoring program that is monitoring the designated port of the computer system for ERPs.

In various embodiments a designer can establish that the sequence take steps 57, 58, 59 and 60 in various orders, as may be most desirable or efficient for his system. The Daemon preferably forks a copy of the Access Control Manager process or ACM in process step 57. The ACM then takes over the now established connection to the Gateway CGI, receiving the sent ERP in step 58. In Steps 57 and 60 the ACM performs User authentication, preferably via a common User database (if the request is for a private URL) although other suitable methods of authenticating the call are certainly useable and an appropriate method for such authentication should be selected by the designer to with reference to the kinds of expected users, the availability of the system, the value of the data and so forth. For one example, the ACM can also solicit a UserID/Password if necessary by sending an encrypted request back through the Gateway CGI which decrypts it and sends it to the web server and back to the user for a reply. (A secure socket layer (SSL) can be used for the encryption/decryption if desired). The reply with the requested information can then be sent through the Gateway CGI, stripped and packaged and encrypted and sent through to the ACM. Once the security has been established and authentication made, the ACM unpackages the call and uses its own rule-based logic to interpret the packaged call (the ERP) in step 59. A query should then be performed, step 81, to determine whether there is a CGI call, however, the programming will simply branch to either run the CGI and collect information required by the CGI in step 61 or use the reconstituted URL to retrieve the resource, HTML page, data, image or whatever information that is at the specified URL by way of step 82. Thus the next step in either branch will be to return the information, i.e., the HTML page, download file, or graphic, or result of the launch of the "real" application CGI (from step 61) in the secure Host at step 62. The information being returned is served back (step 62), preferably in encrypted form, to the web browser over the network (step 64) after first to the Gateway CGI (in step 63) for decryption and when decrypted, to the internet visible web server.

Advantageously for a CGI call, environmental variables are established, the original URL (and UserID) are passed to the application CGI, initiating the originally called application CGI as step 61. Then both the Access Control manager (ACM) and the Gateway CGI can go into a passthrough mode so the application CGI appears to be directly communicating with the 3rd party Web server for the duration of the transaction. The application CGI processes the User's request, accessing local and/or remote data to an Intranet to do so. When completes, it reports back to the Web server (via the passthrough connection), which sends the result to the User's browser and closes the connection to the application CGI (step 65). The Application CGI can be any standard CGI and no special code in the application CGI is required to support this process. Therefore any ordinary, existing CGI can be used by this system without modification to accommodate the inventive Gateway CGI/ACM system.

If the call involves access to a proprietary database, particularly one like ORACLE, accesses, whether local or remote, are performed by a CGI via a database gateway (here shown in FIG. 3B as a Session Controller SC), which is used in this context more for efficient session control than for security. Additional security is provided due to the non-SQL interface between the application 35 and the Session Controller in the preferred embodiment. (A session controller is a gateway application which maintains a pool of open sessions to the database and assigns a session to an incoming request to avoid the overhead of having to open and close database sessions on each access.) In general, however, the application could use SQL directly through the Internal firewall (to remote data 41 for example) since the application system 31 is not Internet-visible and thus suitably secure. Thus, if SQL penetration of firewalls is not allowed in one's system, the use of a session controller can allow for an alternative and perhaps more secure penetration.

It should be recognized that in this invention, the servers in the DMZ do not have a copy of the application that can access the data (the database application), thereby reducing intrusion opportunities exposed by an application bug. There is therefore no need for application maintenance tools, such as compilers, debuggers, and the like, to reside on these systems.

Also, there are no third-arty (i.e., like Netscape or Apache which are well known) Web servers inside the firewall on the secure Host to be exploited. Even if the Server system were to be compromised, the intruder would have to figure out how to use the proprietary sockets interface and encryption to communicate with the ACM in the Host system.

By supporting a common electronic User database which can be used by variety of applications, this system and architecture allows a single log-on to provide access to any participating application. Elements of this strategy in the referred embodiment include:

A local proprietary database like Oracle is maintained with all registered Users, including UserIDs and encrypted Passwords. Administrative interfaces and stored procedures are provided to access and update User information.

When a User accesses the system, the Access Control Module consults its rules to determine whether the target requires a logon. If so, it emits a Form soliciting a UserID/Password. Upon successful entry of a UserID/Password, the ACM sends a cookie to the User's browser, preferably consisting of the UserID, a timestamp, and the User's IP address, all encrypted. On subsequent accesses, the browser passes the cookie, allowing the User to be recognized without another logon.

Following authentication, the "real" or original CGI is called, and is passed the UserID and other variables (parameters and or arguments), using standard web server methods as may be necessary for its function. The target application is responsible for determining which of that application's services are available to the User, using the UserID to access the User database and an optional application-specific database for information about that User.

Alternatively or additionally, each application can maintain its own database of User permissions for that application, identified by UserID, with common User information (such as name, address, Email address, etc.) being kept in the common database. Each application can have its own "User update" interface, which would update some fields in the common database and some (application specific parameters) in the local database.

The inventive system can be simple to control using a small human interface with administrative commands to interrogate and control the Daemon activity, in the preferred embodiment, invoked from a Unix prompt. Each command is in the form <command> <password>, where the password is a single administrator-level password maintained in the ACM configuration file. These preferred commands are not limited to the set below, but these are examples:

STOP—Schedules the Daemon to shut down when it completes all current in-progress activity.

ABORT—Cancels the Daemon and any ACM processes immediately.

STATUS—Displays information about the Daemon and its user database sessions, usage statistics, etc.

DISABLE—Suspends the Daemon from launching new instances of the ACM.

ENABLE—Unsuspends the Daemon from a suspended state.

VERSION—Displays the access system Version number.

ERP—(we call this GCGI in our command table) a message sent to the Gateway CGI to activate the Daemon.

The Access Control Manager (ACM), must accomplish the following functions:

If the target file requires a login, the ACM ensures that the User is logged in.

The ACM determines the path to the target file (whether it's a CGI or data form in the Host or in the remote system, through a session server or whatever may be the required path).

Depending on the path rules in the ACM Configuration File, either serves or executes the requested (target) file.

The Access Control Manager (ACM) created by these inventor's is a program which has many of the characteristics of a Web Server. Although a standard Proxy Server/Web-Server combination could be used, the decision to build a unique one for the most preferred embodiment was based on desiring to provide more flexibility and control, and on the security aspect of being potentially more difficult to exploit because the source code and internal operation are not readily available to a would-be intruder.

The preferred embodiment ACM is driven by a root-viewable configuration file which is preferably maintainable with a text editor. The configuration options for the preferred embodiment ACM are:

PORT—The Port on which the Daemon listens.

ADMPASSWD—The Administrative Password for executing the Human interface Administrative Commands.

CQDEPTH—The maximum number of Connect Requests queued for the Daemon. When the queue is full, additional requests are rejected, to be re-tried later by the TCP drivers.

SQDEPTH—The maximum number of Service Requests queued for the Access Control Manager. When the queue is full, additional requests are rejected.

CHILDREN—The maximum number of simultaneous copies of the ACM allowed.

DB—The Database Name, and login UserID/Password for accessing the User database.

LOG—Specifies logging options.

MIMEPATH—Specifies the path to the MIME Type definition file.

WELCOME—Specifies the path to the default Welcome object.

EXECUTE—Specifies the path prefix to all Executable objects (CGIs). If a requested object is not in one of the specified paths, it will not be executed.

PRIVATE—Specifies the path prefix to Private objects (Those requiring a log-on). If a requested object is not in one of the specified paths, it is considered public.

ALIAS—Specifies the path prefixes subject to redirection, and the substitution prefix to effect the redirection.

Further Details Regarding Log-on Control

Log-on control is handled by the ACM in the preferred embodiment. An ACM configuration file identifies all key path elements which require a log-on. When the User accesses one of these Private objects, the ACM looks for an access cookie passed by the browser. If the cookie exists, and a time stamp has not expired, the request is processed. If not, a log-in page is sent back to the browser to solicit the UserID/Password. When the browser returns the log-in form, the UserID/Password are validated against the User database described above, an access cookie is returned to the browser, and the original request is processed. Subsequent accesses will pass the cookie and will be allowed to proceed. The cookie will preferably be encrypted to discourage spoofing, and will expire when either the User's browser session terminates, the incoming IP address changes, or an inactivity timer expires.

It would also be preferred that Users who refuse to accept cookies will have to log on each time they access privileged services.

We have described the invention in sufficient detail for people of ordinary skill in these arts to make and use it when the description is applied to many sets of hardware and software that may be useful in implementing the invention. For example, in these arts it is well known that programs and processes can be substituted for circuitry, and vice versa, where hardware processes and software processes can provide similar or identical functions, without modifying the inventive concepts taught herein in any way. In using the invention, many alternative forms may occur the designer, however, the scope of the invention is only limited by the following appended claims.

What is claimed is:

1. A method for use with a computer system having an internet visible web server accessible to a web browser for sending response messages fulfilling calls from said web browser by sending back to said web browser an item requested in said calls, the method comprising:

a. transmitting a received call from said Internet visible web server to an Gateway CGI (Gateway CGI), b. transferring, via said Gateway CGI, Internet visible Web server the call to an Gateway CGI program, c. extracting and packaging said call by said Gateway CGI program into an Encoded Request Package (ERP) with sufficient information to reconstruct the call, d. establishing, via said Gateway CGI, a socket to communicate with an instance of a second server (hereinaftter an ACM) in a secure part of said computer system, e. transmitting information embodied in the original request in said ERP to said ACM, f. reconstructing said call by said ACM, g. attempting to verify access privileges for said call, h. if access privileges are verified retrieving, by said ACM, said item requested by said call, i. forwarding said item to said Internet visible web server, j. sending said item to said Gateway CGI across said socket, k. serving said item in a message to said web browser from said Internet visible web server:

wherein said establishing step "d." occurs by first signaling from said Gateway CGI to a Daemon in said secure part of said computer system across an establishment socket to which said Daemon is attuned, establishing an instance of said ACM by said Daemon and attaching said ACM to a communications socket through which all further communication between said ACM and Gateway CGI shall occur, and occur, and port information is sent to said Gateway CGI from said Daemon to indicate on which port said ACM will communicate with said Gateway CGI.

2. The method of claim 1 wherein transmitting step "a." occurs within a single computer system.

3. The method of claim 1 wherein said signaling and said all further communications is encrypted.

4. The method of claim 1 wherein said signaling does not contain an ERP.

5. The method of claim 1 wherein said signaling does contain an ERP and wherein said establishing of an instance of said ACM by said Daemon includes transfer of sad ERP to said ACM.

6. The method of claim 1 a wherein in step "g." wherein the ACM does the verification and if the ACM fails to verify the call, the ACM terminates.

7. The method of claim 1 wherein in step "g." wherein the ACM does the verification and if the ACM fails to verify the call, the ACM returns a request for a log-on.

8. The method of claim 7 wherein the ACM embeds user request information in the logon request.

9. The method of claim 1 wherein in step "g." wherein the ACM does the verification and if the ACM falls to verify the call, the ACM communicates this failure to said Gateway CGI and awaits further verification information.

10. The method of claim 1 wherein said step "h." includes activating a CGI on said secure system.

11. A method for operating web server comprising:

establishing an internet, visible web server (hereinafter IVWserver) to receive calls from web browsers on the internet, receiving said calls, relaying said calls to an Gateway CGI on a same computer system with said IVWserver;

packaging information from said calls into an Encoded Request Packet (ERP) sufficient to recount said calls from said ERP, establishing a communication channel between said Gateway CGI and an Acess Control Management (ACM) program on said secure computer system, authenticating the call, sending the ERP to said ACM program, reconstructing the call by said ACM program, executing the call by the ACM program, sending a result from said call execution to said Gateway CGI, providing said result to said IVWserver, sending said result to said web browser;

wherein said step of establishing a communication channel between said Gateway CGI and an ACM program on said secure computer system comprises:

contacting a Daemon on said secure computer system by said Gateway CGI, sending a request for an ACM to said Daemon by said Gateway CGI spawning an ACM by said Daemon, sending port information to said Gateway CGI from said Daemon to indicate on which port said ACM will communicate with said Gateway CGI.

12. The method of claim 11 wherein said receding step comprises, receiving a call at a dispatcher, selecting a one of a set of IVWservers by said dispatcher, and sending said call to said selected one by said dispatcher.

13. The method of claim 11 wherein said establishing occurs by first signaling from said Gateway CGI to a Daemon in said secure computer system across an establishment socket to which said Daemon is attuned, establishing an instance of said ACM program by said Daemon and attaching said ACM to a communications socket through which all further communication between said ACM and Gateway CGI shall occur.

14. The method of claim 13 wherein said Daemon signals said Gateway CGI information regarding the communications socket.

15. The method of claim 11 wherein said executing includes activating a CGI on said secure computer system.

16. The method of claim 15 wherein said activated CGI is a session controller for a database and wherein said session controller maintains an open session for a user to use data in a working database.

17. The method of claim 16 wherein said working is not located on said secure computer system but on an intranet and said session controller maintains an open session through an intranet firewall.

18. The method of claim 11 wherein said authenticating requires matching of information transferred by the web browser to expected information.

19. The method of claim 18 wherein a session controller further authenticates the call.

20. The method of claim 18 wherein said secure computer system maintains a user database for containing at least some of said secure computer information.

21. The method of claim 11 wherein said executing includes retrieving flies, including those file types in the set {HTML, image, data} from said secure computer system.

22. The method of claim 11 comprising a step prior to said establishing an IVWserver to receive calls from web browsers on the internet wherein said prior step comprises:

receiving at a dispatcher all calls from web browsers, and routing each received call to an available IVWserver in a pool of IVWserver.

* * * * *